United States Patent
Reiss et al.

(10) Patent No.: US 6,477,609 B1
(45) Date of Patent: Nov. 5, 2002

(54) BRIDGE STATE-MACHINE PROGRESSION FOR DATA TRANSFERS REQUESTED BY A HOST BUS AND RESPONDED TO BY AN EXTERNAL BUS

(75) Inventors: Loren B. Reiss, Raleigh, NC (US); Bonnie C. Sexton, Cary, NC (US); D. Adam Shiel, Eau Claire, WI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/495,043

(22) Filed: Jan. 31, 2000

(51) Int. Cl.[7] ................................. G06F 13/00
(52) U.S. Cl. ................. 710/306; 710/100; 710/107; 710/313; 710/260
(58) Field of Search ................. 710/107, 100, 710/305, 306, 313, 314, 315, 260, 267, 268

(56) References Cited

U.S. PATENT DOCUMENTS 5,943,500 A * 8/1999 Maguire et al. ............ 710/260

* cited by examiner

Primary Examiner—Xuan M. Thai
(74) Attorney, Agent, or Firm—Peter Zawitski

(57) ABSTRACT

An expansion module for a Handspring Visor (which conforms to the Springboard bus specification) includes a multi-master AMBA Advanced System Bus (ASB). Optionally, an Arm7 processor is attached to this bus via an Arm7 to ASB interface as one master. The Springboard bus of the visor is coupled to the ASB bus via a Springboard-to-ASB-bus bridge. This bridge comprises a protocol translator and a second Arm7 to ASB interface. The protocol translator translates bi-directionally between the Springboard bus protocol and the Arm7TDMI protocol. The translator includes an interface to the Springboard bus and a state machine. The state machine coordinates data transfers between the buses. The state machine also monitors signals indicating when each of said buses begins to treat a data transfer as complete so that the data transfer can be validated or flagged as an error condition. A programmable counter adjusts maximum counts to compensate for different clock frequencies in measuring a write-wait state duration to ensure valid writes from the Visor to the ASB bus. Using this basic design framework, a developer of Springboard expansion modules can take immediate advantage of the performance and the variety of peripherals available for the ASB bus. Furthermore, using the same translator and merely changing the interface to the external bus, a Springboard developer can take advantage of peripherals developed for other external buses as well.

10 Claims, 10 Drawing Sheets

BRIDGE STATE-MACHINE PROGRESSION FOR DATA TRANSFERS REQUESTED BY A HOST BUS AND RESPONDED TO BY AN EXTERNAL BUS

BACKGROUND OF THE INVENTION

The present invention relates to computers and, more particularly, to computer bridge interfaces. A major objective of the present invention is to facilitate the development of accessories for the Handspring computer platform.

Much of modern progress is associated with the prevalence of computers, which are assuming an increasing variety of forms. Increasingly popular are hand-held computers that include software for helping people to organize information such as phone numbers, addresses, schedules, finances, etc. Such handheld computers are often referred to as "personal digital assistants" or "PDAs". Provisions are made for adding software to provide for additional applications so that a user can extend the functionality of a PDA, while maintaining its familiar interface.

The most popular PDA recently has been the Palm Pilot available from 3com. The user interface is considered intuitive, and software development for the Palm Pilot has become an industry of its own. However, hardware expandability of the Palm Pilot is limited. This has contrained the development of applications that could benefit from the Palm Pilot interface, but require more or different processing capabilities that the "Dragonball" processor used by the Palm Pilot. The Visor, available from Handspring, Incorporated, is similar to the Palm Pilot and shares its user interface and operating system. The Visor differs from the Palm Pilot since it includes a mechanism (the "Springboard Expansion Slot") for hardware expansion. The specifications for this expansion slot have been publised by Handspring to encourage the development of expansion modules to extend the capabilities of the visor. The interface for the expansion slot is described in detail in the "Development Kit for Handspring Handheld Computers" available at the Handspring website www.handspring.com. In view of the publication of the interface specifications and active encouragement by Handspring to third party developers, it is likely that there will be intense Visor-compatible hardware development efforts.

While it is an important advance for devices with the Palm Pilot interface, the expansion slot has significant limitations. The logical bus interface for the Springboard expansion slot is a "slave"-only bus interface in which the Dragonball processor is the master and the expansion module is the slave. Basically, the Dragonball processor can initiate 16-bit reads and writes from and to the expansion module. Module-initiated communications are limited to a single interrupt. Additional control signals are provided to provide for hot-swapping (exchanging without powering down the PDA) expansion modules and for power management.

Buses that have higher-performance and that are more flexible than the Springboard expansion bus are well known. For example, multi-master buses provide for parallel processing among different masters that communicate with each other and slave peripherals over the bus in a time-multiplexed manner. Many of these buses provide for variable wait states to provide flexible timing, while the Springboard expansion slot does not. A good example of such a multi-master bus is the Advanced System Bus or ASB that can be used with ARM7 processors for system-on-a-chip designs. The ASB and ARM7 specifications are available from Arm Limited, of the United Kingdom.

An ARM7 (more specifically, an ARM7TDMI) can be coupled to an ASB bus through an ARM7TDMI-to-ASB-Bus interface, available from Philips Electronics. The ASB bus can issue wait and grant signals that can affect the timing of data transfer requests originated by the ARM7 processor. These "handshaking" signals allow timing to vary on a per-transaction basis, which facilitates data transfers in an environment with a variety of peripherals with different timing requirements and/or multiple masters.

In contrast, the Springboard expansion bus does not provide for handshaking with the expansion module. Instead, transactions are "presumed" complete after a predetermined lapse of time. An expansion module can set this lapse of time upon insertion into the Springboard expansion slot. The expansion module must be designed so that all transactions are complete by the time the Visor presumes they are complete; otherwise, serious errors can result.

Associated with each bus is a specification that includes physical and logical protocols to which master and slave peripherals must conform. Typically, when a new bus is introduced, many peripherals are designed to be compatible with it. Some of these may be designed from the circuit level, while others may involve modifications of designs conforming to other bus standards.

If the bus is adopted for many applications, a library of peripheral design modules is often developed. This permits a modular approach to produce design, which greatly facilitates product development and reduces the time between conception and market entry. Such time-to-market advantages are critical in highly contested market areas, such as that expected for Handspring expansion modules.

The relatively simplicity of the Springboard expansion bus is certainly facilitates product development to a point. However, the functional limitations of the bus present a challenge, as the market demands more powerful expansion modules. What is needed is a system that provides for rapid development of powerful expansion modules for Springboard and similar expansion buses.

SUMMARY OF THE INVENTION

The present invention provides for a bridge between a host system and an external bus, where the host system includes a host processor and a host bus that provides an expansion interface. The host processor serves as the master of the host bus, and the external bus can serve as a part of a slave on the host bus. For example, a multi-master ASB bus can be bridged to the single-master Springboard bus of the Handspring Visor. In this case, the Visor's Dragonball processor is the master of the Springboard bus, and the combination of the bridge and the ASB bus is a slave. A user can thus be provided with the performance and flexibility of the ASB bus, while retaining the familiar, ergonomic interface associated with the Visor (and other Palm-compatible computers).

A developer for the relatively new Springboard platform can take advantage of the existing library of design modules available for the relatively mature ASB bus. Thus, the invention provides a rapid development platform for the competitive Springboard-compatible marketplace. Even where every function desired by the developer is not provided in the ASB library, the number of functions that must be met by designing new modules is greatly reduced by the present invention.

In general, to the extent that new module designs are required, they can take advantage of the features of the external bus. If the external bus is a multi-master bus, the new modules can function as masters on the multi-master bus and/or can take advantage of additional computing power made available by other masters on the multi-master bus.

A serendipitous additional advantage of the invention is that functional modules developed with the PDA platform in mind can have a bigger-than-intended market. For example, ASB bus peripherals developed for the Handspring Visor are then available as library modules for non-Springboard applications utilizing the ASB bus. Accordingly, the present invention allows development costs to be distributed over a larger-than-expected marketplace. Thus, the present invention can lower development costs attributable to the originally intended application. This advantage is in addition to the afore-mentioned advantages of more rapid development for the developer and more computing power to the user.

The present invention further provides that the bridge can include a translator between a host-bus protocol associated with the host (e.g., Springboard) bus protocol and a target-processor protocol associated with a target processor (e.g., the Arm7). In this case, the bridge further includes a processor-to-multi-master bus interface that translates from the target-processor protocol to an external-bus protocol. Dividing the bridge in this way simplifies the task of bridge design since it can take advantage of an existing processor-to-external-bus interface, e.g., an existing Arm7-to-ASB interface.

In the case of a Springboard to Arm7 translator, a complete translation is not possible. The Arm7 responds to a "wait" signal while a data transfer is in progress, while there is no corresponding signal in the Springboard protocol. Accordingly, the translator can include a state machine that monitors signals that indicate when each of the buses begins to treat a data transfer as complete. These indications can be used to validate (or invalidate) data transfers.

A method implemented by the bus bridge with translator begins with a data-transfer request, originated by the host processor, and output from the host bus in conformity with the host-bus protocol. The bridge translates the request into the target-processor protocol, and provides the request in that form to an external-bus interface. The external-bus interface translates the request from the target-processor protocol to the external-bus protocol—in which form it is provided to the external bus. A bridge state machine can monitor signals that indicate when each of the buses begins to treat the requested data transfer as complete. If the host bus begins to treat the data transfer as complete before the external bus does, the bridge can indicate an error condition.

In the case the external bus might otherwise respond to a write request so fast that it writes data before it is valid, the state machine can include a write-wait state during which the data can complete its transition and before the write request is forwarded to the external bus. A counter can be used to count a number of external-bus clock cycles matching the duration selected for the write-wait state. The counter can be a down counter that is continuous reset to the selected number of clock cycles in every state but the write-wait state.

The expansion module can provide for a low-power mode when maximal performance is not required. In low-power mode, the external-bus clock frequency can be reduced to save power. In this case, the number of cycles corresponding to the desired write-wait duration is reduced. Thus, the invention provides for changing the write-wait count, for example, as a function of bus-clock frequency.

There is a surprising additional advantage to using a bus-to-processor protocol translation in the bus bridge. The bridge can be readily modified to accommodate other external buses. The translator remains the same; only the bus interface is changed. Thus, the design effort required to interface to one multi-master bus serendipitously provides for interfaces with other buses for which interfaces exist for the same processor. Thus, for example, a Springboard/Arm7 translator can be used in bridges to non-ASB buses for which Arm7 interfaces exist or are being developed. Thus, the invention makes it convenient to select from a variety of external buses for coupling to the single-master bus. A selection can be made based on different capabilities of the external buses themselves and/or on the contents of their associated design module libraries.

In accordance with the foregoing, the present invention provides a design method for expanding the capabilities of a system with a host processor and a single-master bus with an associated expansion interface. In the first step, an external bus is selected, e.g., based on performance and/or availability of design modules.

In the second step, a target processor is selected. In general, the target processor selected is one for which an interface to the selected external bus exists. To minimize the numbers of protocols and interfaces a developer must contend with, a processor planned for actual use with the external bus in a product design would be favored over a processor not planned for such use in selecting a target processor. For example, if interfaces for both an ARM7 and an Intel Pentium are available, but only the ARM7 is to be used as a bus master for the external bus in an Springboard expansion module, then the ARM7 would be selected over the Pentium to provide the target processor protocol for the translator selected in the third step.

In the third step, a translator between the host bus and the processor protocols is selected (if available) or designed. In general, this translator can include a state machine that coordinates the protocols and an interface to the host bus. Finally, the translator is coupled to the host-bus and to the external-bus interface, and the external-bus interface is coupled to the external bus.

In a more straightforward method, the desired functionality would be designed directly for the host bus, e.g., the Springboard bus. In principle, this straightforward approach allows the desired functionality to be achieved with greater simplicity and reliability. If multi-mastering is required, the straightforward approach would be to bridge a multi-master bus designed with the host bus in mind directly, without emulating a processor.

In practice, these advantages can be more than offset by the more rapid development afforded by the present invention. The tradeoff is even more favorable when it is considered that peripherals designed for the host bus are also compatible with other applications that use the same external bus. In addition, the invention makes it easy for one host bus to access the features of alternative external buses. These and other features and advantages of the present invention are apparent from the following description with reference to the following drawings.

DETAILED DESCRIPTION OF THE PREFERRED EMBODIMENTS

Figure 1:
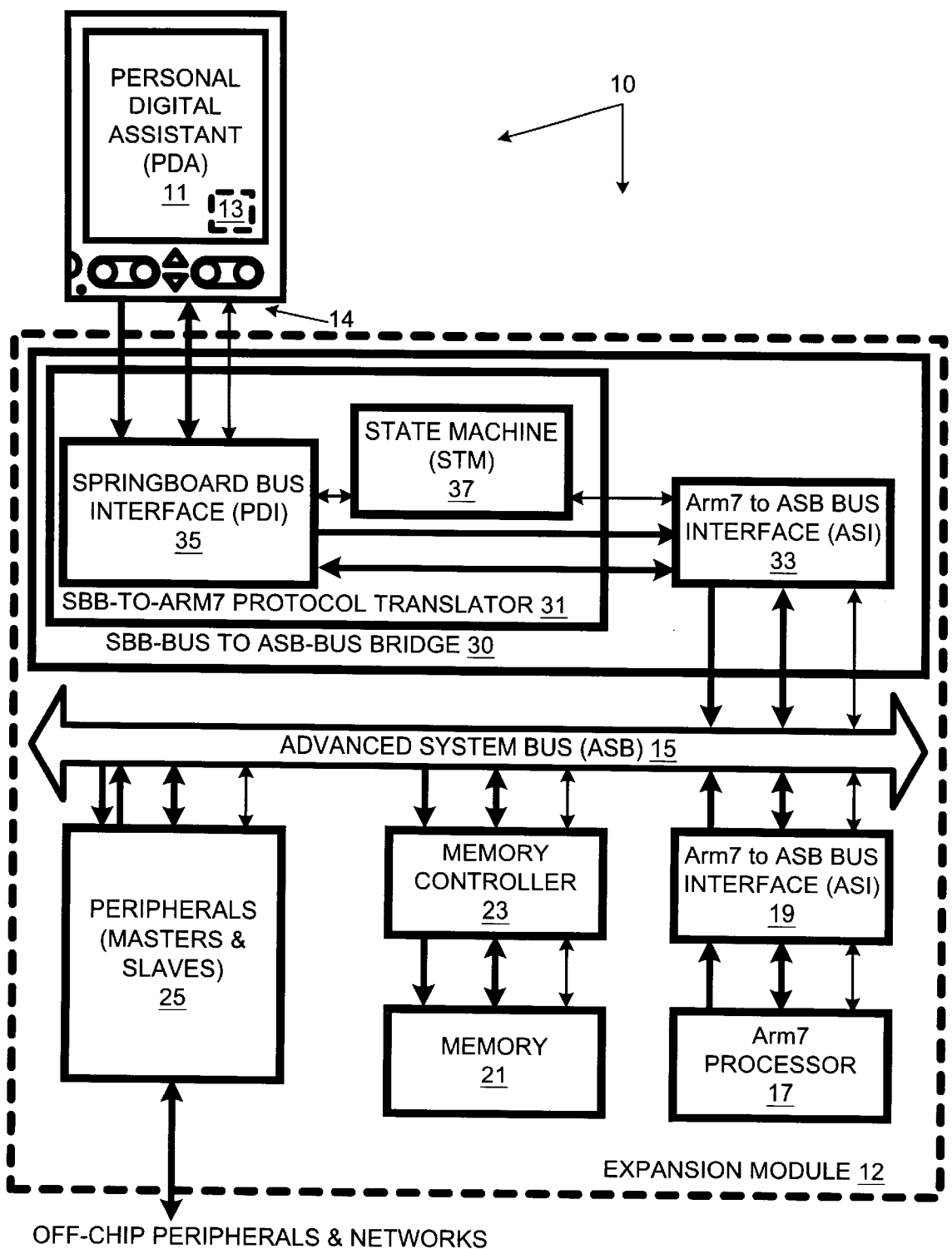
FIG. 1 is a schematic illustration of a system including a personal digital assistant with an expansion module having a bus bridge to an ASB bus in accordance with the present invention.

A PDA system 10 includes a personal digital assistant (PDA) 11 and an expansion module 12, as shown in FIG. 1. PDA 11 is a Visor, available from Handspring Incorporated. In the Visor, a Dragonball processor 13 serves as the master of the single-master Springboard expansion bus (SBB) 14. Expansion module 12 can be installed in the "Springboard" expansion slot provided on PDA 11.

Expansion module 12 includes an Advanced System Bus (ASB) 15 to which various functional modules are attached. An Arm7TDMI processor 17 is attached to ASB bus 15 via an Arm7-to-ASB interface (ASI) 19. (Note that the Arm7TDMI is one of many variants of the Arm family of processors having slightly different protocols; hereinafter, Arm7 means "Arm7TDMI", unless otherwise noted.) Memory 21 is attached to ASB bus 15 via a memory controller 23. In addition, various ASB peripherals 25 are attached to ASB bus 15. These peripherals include both masters and slaves. Some peripherals, e.g., an RS232 communications interface can provide for coupling to external peripherals.

Expansion module 12 also includes a bridge 30 from Springboard bus SBB 14 to ASB bus 15. Bridge 30 includes a protocol translator 31 that translates between the Springboard bus protocol and the Arm7TDMI processor protocol. In addition, expansion module 31 includes an Arm7-to-ASB-bus interface (ASI) 33, which is identical to ASI interface 19. This identity is made possible since translator 31 "appears" as an Arm7 processor to ASI interface 33. Translator 31 includes the SBI interface 35 and a state machine (STM) 37 that coordinates the Springboard bus operations and the ASB bus operations via interfaces 33 and 35.

Figure 2:
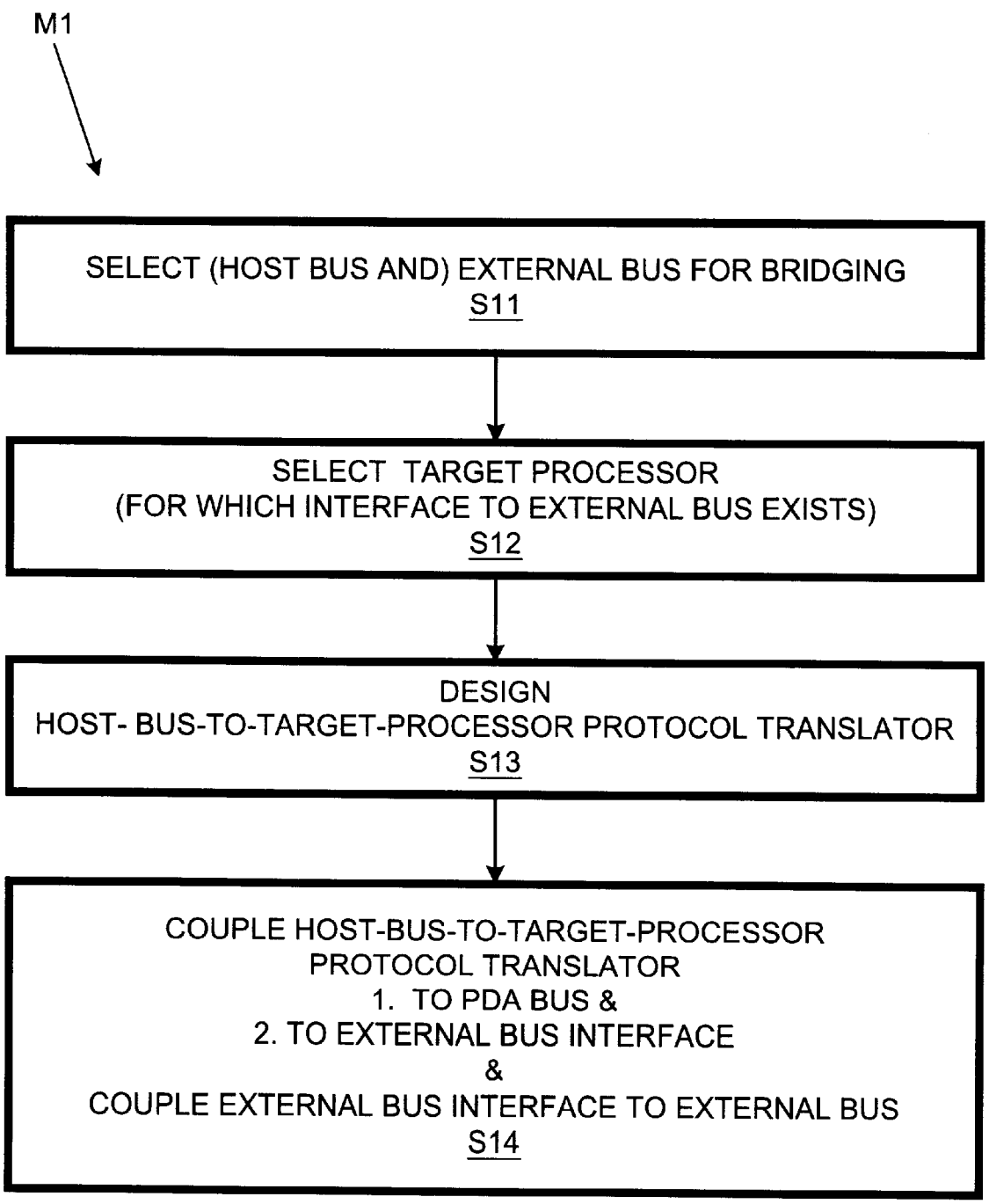
FIG. 2 is a flow chart of a method of the invention used to design the bridge of FIG. 1.

Expansion module 12 is designed according to a method M1 flow-charted in FIG. 2. At step S11, an external bus is selected for bridging to the host bus. (More generally, both the host bus and the external bus can be selected at step S11.) Since Springboard bus SBB 14 is already hosted by a master (Dragonball processor 13), the external bus is to be treated as a slave by the host bus. Despite this, the external bus can be a multi-master bus, such as the ASB bus.

A target processor is selected at step S12. Preferably, the target processor is selected for which there is an interface to the external bus.

Alternatively, an interface can be in development. In the present case, the target processor is the Arm7TDMI. The corresponding ASB bus interface is the HDLi ARM7-to-ASB interface available from Philips Semiconductor.

A protocol translator between the host bus and the target processor is selected or designed at step S13. In this case, translator 31 is designed to translate between the Springboard protocol and the ARM7TMI protocol.

Finally, at step S14, the translator is coupled to the host bus and the processor-to-external-bus interface. The latter interface is coupled to the external bus. In this case, translator 31 is coupled to SBB bus 14 and to interface 33, which is coupled to ASB bus 15.

Before detailing bridge 30 further, it should be noted that the present invention relates more to a product development approach than to a single product. A product developer has great flexibility in selecting the components corresponding to those below ASB bus 15 in FIG. 1. Memory can be unified or distributed; one type of memory can be used or multiple types can be used. Multiple processors, one processor, or zero processors can be used. Processors of different types can be used, general-purpose processors, math coprocessors, digital signal processors, etc. These can all be fabricated on a single integrated circuit as a "system-on-a-chip" or multiple integrated circuits can be used. There is great flexibility for the developer to select the components that best match the design objectives.

Figure 3:
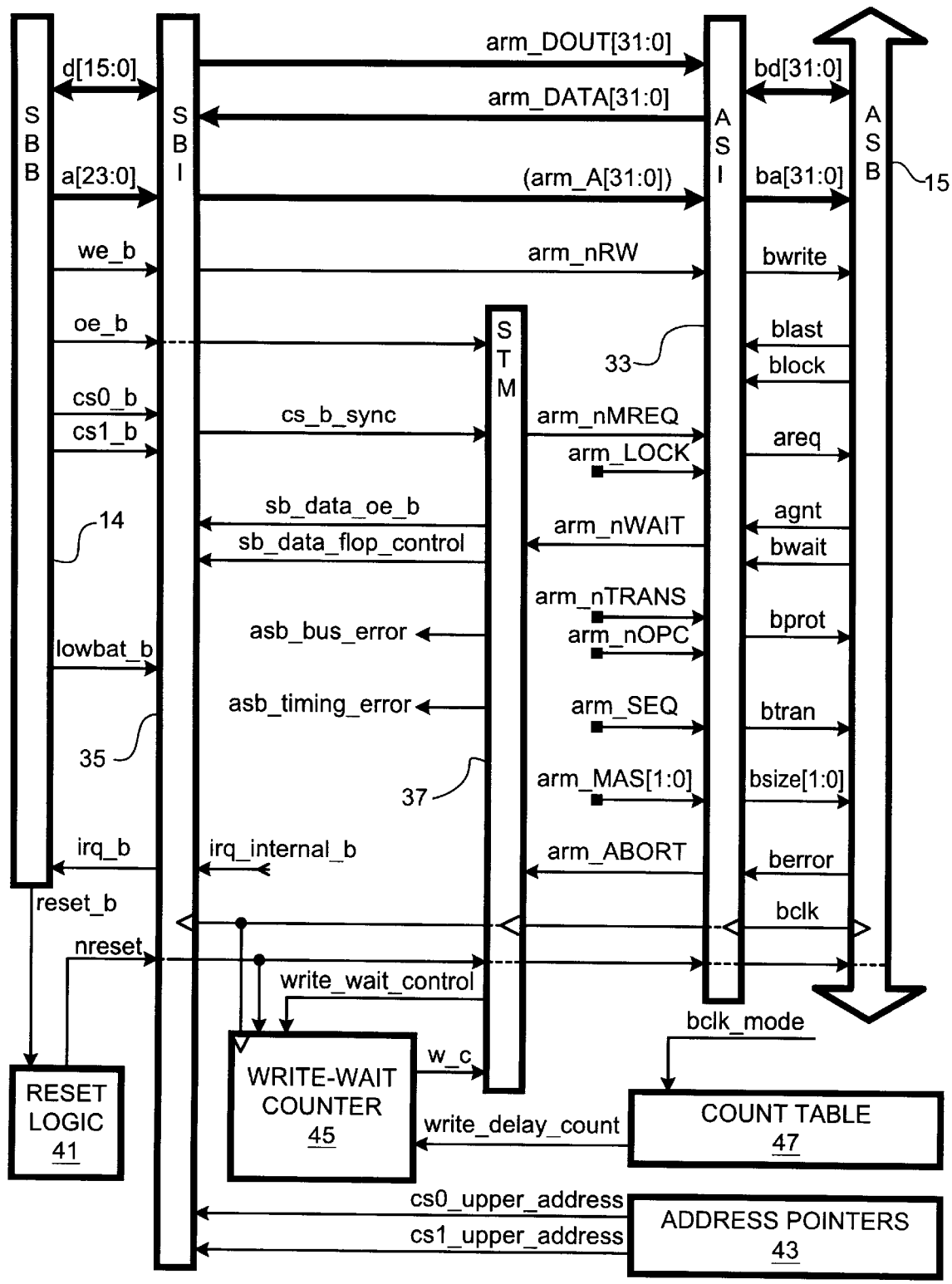
FIG. 3 is a signal flow diagram for the system of FIG. 1.
Figure 4:
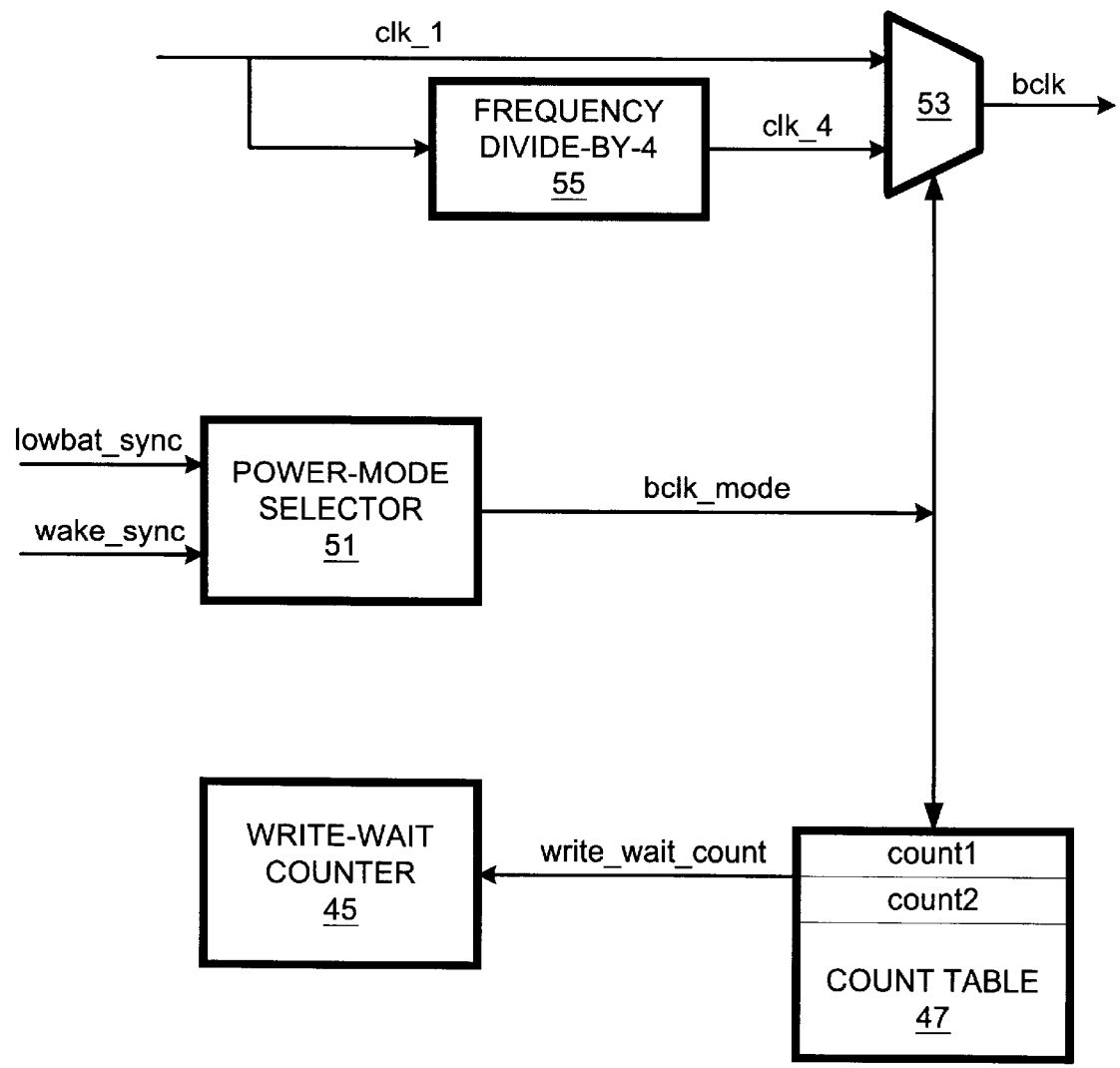
FIG. 4 is a logic diagram of mode-control logic for the system of FIG. 1.

Signal flow between SBB bus 14 and ASB bus 15 is summarized in FIG. 3. In FIG. 3, all functional blocks other than SBB bus 14 are incorporated in expansion module 12. In addition to those components described above with reference to FIG. 1, expansion module 12 includes reset logic 41, address pointers 43, a write-wait count selector 45, and a write-wait counter 47. Additional components shown in FIG. 4 include a frequency divider 51, a multiplexer 53, and a power-mode selector 55.

Reset logic 41, FIG. 3, triggers a reset of incorporating expansion module 12. The criteria for triggering a reset are selected by the developer. FIG. 3 indicates that a resetb signal from SBB bus 14 can be used in determining the newest signal that triggers the module reset. Note that both "_b" and "_n" indicate active-low signals in FIG. 3 reflecting the fact that different naming conventions are employed by different manufacturers.

Address-pointer block 43 defines constant 8-bit-wide signal sets cs0_upper_address and cs1_upper_address used to define locations in the ASB address space (which includes memory 21) to be accessible to SBB bus 14 (see Table I). cs0_upper_address is used when cs0 is active. cs1_upper_address is used when cs1 is active. In practice, cs0_upper_address determines the region in the ASB address space that PDA 11 looks to upon insertion of module 12, and cs1_upper_address defines a region in the ASB address space for applications. The regions are selectable during development. At the option of the developer, address-pointer block 43 can be programmable. Alternatively, its contents can be fixed, e.g., by hard wiring signal lines.

TABLE I

Configuration Signals

| | |
|---|---|
| cs0_upper_address[7:0] | Upper 8 ASB address bits that define the region of ASB address space for cs0 accesses |
| cs1_upper_address[7:0] | Upper 8 ASB address bits that define the region of ASB address space for cs1 accesses |
| write_delay_count[7:0] | Initial counter value for write delay, i.e., initial value of w_c. This is the number of clock cycles SB-ASB will wait between when it recognizes that the Springboard interface is requesting a write and when it asserts a |

TABLE I-continued

Configuration Signals request to the ASB interface to perform the write. This wait time is necessary in order to guarantee that the write data from the Springboard interface is valid prior to starting the ASB write cycle. The SB-ASB synchronizes the chip select signals from the Springboard interface internally by double clocking the signals. The synchronized signals are what are used to detect the start of the transaction. Therefore, the value used for this configuration signal should be the minimum number of clock cycles between the synchronized chip selects going active, and the Springboard write data going valid.

Write-wait counter 45 is, in effect, a programmable delay to ensure that write data from SBB bus 14 is valid (i.e., the data lines have stabilized) before it asserts a memory request arm_nMREQ signal. The delay corresponds to the number of clock cycles counted down by write-wait counter 45 until it reaches zero. The 8-bit number counted down from is write_delay_count, which is determined by count table 47.

Count table 47 is a two-location look-up table, which accordingly stores two 8-bit counts, count1 and count2. Table 47 is addressed by a bclk_mode signal. This signal is generated by a power-mode selector 51, shown in FIG. 4. Power-mode selector 51 monitors bridge activity (as determined by the developer) to determine whether high-performance mode is required or whether lower performance can be allowed to save power. For example, low_bat_b sync can be used to trigger a transition to low-power mode, while wake_sync can be used to trigger a transition to high-performance mode. In the event that a low-power mode is selected, bclk_mode is asserted.

This signal controls a multiplexer 53, which has as its input a first clock signal clk_1, and a second clock signal clk_4. Signal clk_4 is derived from clk_1 by frequency divider 55. Specifically, the frequency of signal clk_4 is one-fourth that of signal clk_1. During high-performance mode, bclk_mode is not asserted and clk_1 is selected as ASB bus clock bclk. During low-power mode, bclk_mode is asserted, causing multiplexter 53 to select clk_4 as bclk.

If write_wait_count were fixed, the duration corresponding to the number of cycles counted down by write-wait counter 45 would be four times that required to ensure valid write data. Despite the fact that optimal performance is not required in low-power mode, the excessive write delay can be unacceptable. Accordingly, when bclk_mode is asserted, the smaller count2 is selected as write_wait_count, the only the optimal write-wait duration is counted down. When expansion module 12 is engaged with PDA 11, Dragonball processor 13 automatically reads addresses beginning with address 0 at the memory region associated with cs0_upper_address. A program at this location can specify a delay to be used by PDA 11 when it makes requests to expansion module 12. This delay can correspond to a maximum time expansion module 12 requires to respond to a data-transfer request from processor 13.

Referring again to FIG. 3, most of the signals referenced therein are defined by public specifications. The signals entering and exiting SBB bus 14 are defined by the Springboard specification (see Table II).

TABLE II

Springboard Signals

| Signal | Description |
|---|---|
| d[15:0] | Data bus. |
| a[23:0] | Address |
| cs0_b, cs1_b | Chip selects |
| we_b | Write enable |
| oe_b | Output enable |
| irq_b | Interrupt to PDA |
| lowbat_b | Low battery indication from PDA |
| reset_b | Reset from PDA |

The signals between ASB bus 15 and ASI interface 33 are defined by the ASB bus specification (see Table II).

TABLE III

ASB Signals

| Signal | Description |
|---|---|
| bclk | Clock |
| btran[1:0] | ASB transaction type |
| ba[31:0] | ASB address |
| bwrite | ASB write signal |
| bsize[1:0] | ASB transaction size indication |
| bprot[1:0] | ASB transaction protection information |
| agnt | Select signal from ASB bus arbiter |
| areq | Request signal to the ASB bus arbiter |
| bwait | ASB wait signal |
| berror | ASB transaction error signal |
| blast | ASB last indicator |
| bd[31:0] | ASB data bus |

The signals between translator 31 and ASB interface 33 are defined by the ARMTDMI protocol (see Table IV). Translator 31, shown in FIG. 1, includes the following components shown in FIG. 3: SBI interface 35, and state machine 37 (for which write-wait counter 45 serves as a sub state machine).

TABLE IV

Arm7-Protocol Signals

| Signal | Description |
|---|---|
| arm_A[31:0] | ASB address |
| arm_nWAIT | Wait signal. 1 'b0 = wait, 1 'b1 = no wait |
| arm_ABORT | Abort |
| arm_nMREQ | Memory access request |
| arm_SEQ | Sequential access indication. Tied low to produce non-sequential transactions |
| arm_nRW | Read or write |
| arm_MAS[1:0] | Transfer size. Tied to 16-bit accesses. (This signal is specific to the ARM7TDMI; it is not used by all Arm processors) |
| arm_nTRANS | User mode or other mode. Tied to 0 for user mode. |
| arm_nOPC | Instruction or data fetch. Tied to 1 for data |
| arm_LOCK | Atomic transaction indicator. Tied 0 for non-atomic transactions |
| arm_DATA[31:0] | Data from the ASB bus |
| arm_DOUT[31:0] | Data to the ASB bus |

Figure 5:
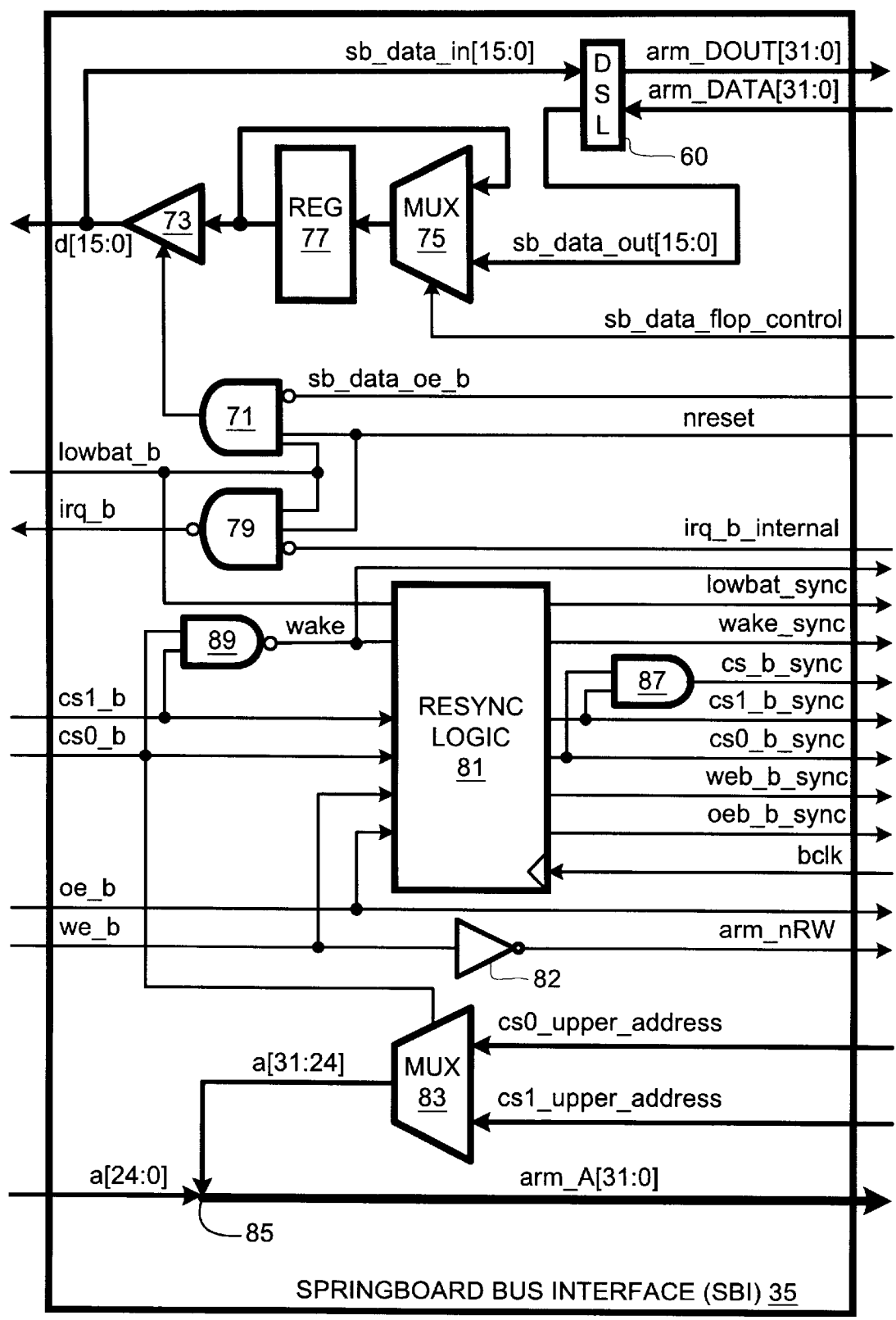
FIG. 5 is a logic diagram of an interface of the bridge of FIG. 1 to the personal digital assistant of FIG. 1.

From FIG. 5, it can be seen that Springboard-bus interface SBI 35 simply forwards write data transferred from SBB bus 14 along bi-directional data bus d[15:0] to data-steering logic 60 as signals sb_data_in[15:0]. Data-steering logic (DSL) 60 manages the data bus conversion from the 16-bit width associated with SBB bus 14 to the 32-bit width provided for by ASB bus 15. Data-steering logic (DSL) 60 is shown in greater detail in FIG. 6. 16-bit write data sb_data_in from SBB bus 14 is duplicated at Y-splitter 61. The resulting 32 data lines are combined to form a single 32-bit data bus arm_DOUT[31:0] that provides data to advanced system interface (ASI) 33.

The combined signal arm_DOUT[31:0] is in the form it would be provided by an Arm7 processor performing a 16-bit write. Only one of the two matching 16-bit values is actually written. Referring to FIG. 3, the width of a memory-transfer operations is determined by signal pair bsize[0,1], which in turn is determined by Arm7TDMI signal pair arm_MAS[1:0]. As indicated by the square tail on the arrow associated with arm_MAS[1:0], these signals are held at fixed values (0,1). This forces doublet (16-bit) transfers. Depending on the value of the second least significant address bit, i.e., address[1], either the sixteen least-significant data bits or the sixteen most-significant data bits are written, but not both.

Figure 6:
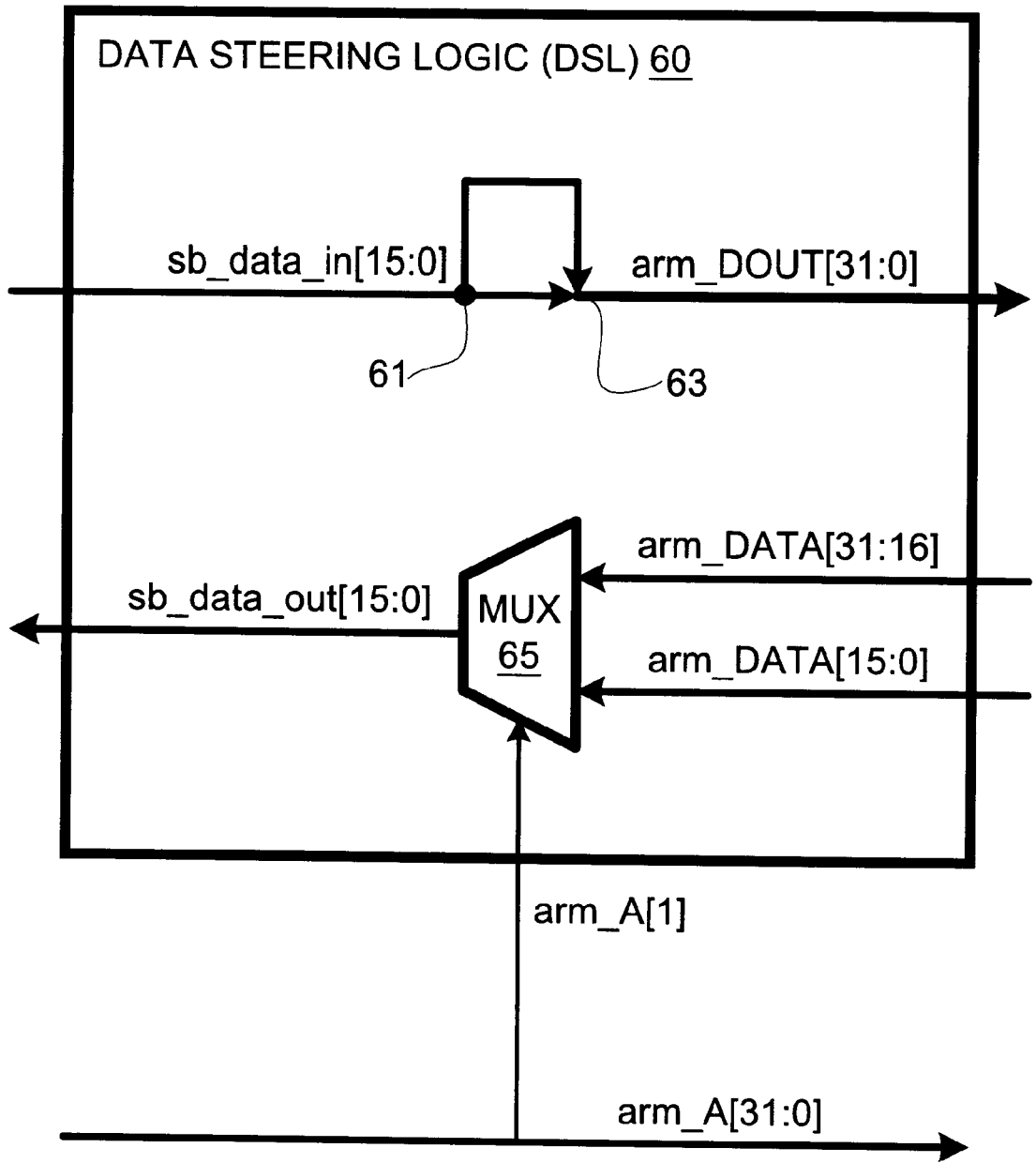
FIG. 6 is a logic diagram of data-steering logic of the bus bridge of FIG. 1.

The second least-significant address bit, address[1], is used to control a multiplexer 65, FIG. 6, of data-steering logic 60. During data read operations, either the sixteen least-significant arm_DATA[15:0] or the sixteen most-significant arm_DATA[31:16] fetched data bits are selected to constitute the data sbdataout[15:0] to be provided to SBB bus 14 in response to a read request. The internal data and address signals for bridge 30, excluding the Arm7 signals, are summarized in Table V.

TABLE V

| Bridge Address and Data Signals (Excluding Arm7 Protocol Signals) | |
| --- | --- |
| arm_A[31:0] | Address provided to the ASB Interface by the Springboard State Machine. Currently, this is the 24 springboard interface address bits with 8 bits concatenated on most significant byte based on the chip selects. |
| sb_data_in[15:0] | Data driven from the Springboard interface to the ASB Interface (i.e. Springboard write data). |
| sb_data_out[15:0] | Data driven from the ASB Interface to the Springboard Interface (i.e. Springboard read data). |

The Springboard specification precludes read data (requested by PDA 11 and provided from ASB bus 15) from completing its course to SBB bus 14 under certain circumstances. The circumstances correspond to the inputs to AND gate 71, the output of which controls a buffer 73 that drives read data to SBB bus 14 along data bus d[15:0]. PDA 11 issues a "low-battery" warning when its battery is low. The Springboard specification requires that an expansion module be functionally decoupled from the PDA when the low battery warning is issued. Active-low low-battery signal lowbat_b, when active, forces the output of AND gate 71 low, tri-stating buffer 73. This prevents read data from being transferred from expansion module 12 to PDA 11. The effect is to conserve battery power for internal PDA functions. Read data is also blocked during an expansion module reset when newest goes low.

In the absence of a low-battery warning or an expansion module reset, AND gate 71 is controlled by state machine STM 37 via signal sb_data_oe_b. State machine STM 37 determines when read data is valid on data bus sb_data_out[15:0]. When the data is not valid, state machine STM 37 holds sb_data_oe_b high. Since this signal is provided to an inverted input of AND gate 71, sb_data_oe_b high holds the output of AND gate 71 low. This low signal tristates buffer 73, so that data is not transferred to SBB bus 14. When the data is valid, sb_data_oe_b is high and buffer 73 drives the read data on bus d[15:0] to SBB bus 14.

A multiplexer 75 and a set of registers 77 prevent the valid read data from changing as the data is driven to SBB bus 14. State machine STM 37 controls multiplexer 75 via signal line sb_data_flop_control_b. Normally, this signal is held high so that multiplexer 75 couples signal sb_data_out[15:0] to the input of registers 77. When state-machine 37 determines the read data is valid, it drives sb_data_flop_control_b low so that multiplexer decouples register 77 from sb_data_out[15:0] and couples register 77 to its output so that the stored value remains stable during the pending transfer to SBB bus 14.

The only signal other than data that the Springboard specification allows to be received by SBB bus 14 from an expansion module is a single interrupt request irqb. As with read data, irqb is not to be asserted during a low-battery warning. Also, it is not asserted in the event of an expansion module reset. Otherwise, it is to be asserted in the event the expansion module asserts an interrupt request irqinternalb. It is up to the developer to determine the circumstances in which this interrupt is issued (as indicated by the feathered tail on the arrow associated with this signal in FIG. 3.) NAND gate 79 is arranged to provide the desired functionality for irq_b.

SBB bus 14 provides several control signals associated with data transfer operations. Since PDA 11 and expansion module 12 do not share a system clock, these control signals are received asynchronously relative by expansion module 12. Synchronization logic 81 provides synchronized versions of SBB control signals so that they can be combined predictably with other signals by module 12. Synchronization logic 81 basically comprises six double flip-flops. Each signal input to resynchronization logic 81 is flopped once on the leading edge of bclk and once on the following falling edge.

A write-enable signal, we_b, is double flopped to yield a synchronized version we_b_sync. The non-synchonized version of we_b is also inverted by inverted 82 to yield an Arm-compatible read/write signal, arm_nRW. An output enable signal oe_b, which serves as a read request, is double-flopped to yield a synchronized read request signal oe_b_sync. Unsychronize oe_b is forwarded to state machine STM 37 for use as described subsequently. Synchronized read and write request signals oe_b_sync and we_b_sync are provided for optional use by the developer.

"Chip-select" signals cs0_b and cs1_b are designed to permit selection between expansion-module memory locations for data transfers. There are many possible ways of mapping the 24-bit address space of SBB bus 14 to the 32-bit address space of ASB bus 15. The mappings actually implemented are determined by configuration values 43 (FIG. 3), specifically, 8-bit configuration value cs0_upper_address and 8-bit configuration value cs1_upper_address. These configuration values are input to a multiplexer 83, which is controlled by cs0_b. Which ever input of multiplexer 83 that is selected defines its output, address[31:24]. These 8 signals join, at a bus node 85, the 24 signals of PDA 11 provide address a[24:0] to define 32-bit address 31:0, which corresponds to the Arm7 protocol.

Asynchronous chip select signals cs0_b and cs1_b are ANDed by an AND gate 89 to yield an asynchronous "wake" signal wake. Resynchronization logic 81 converts this asynchronous "wake" signal to a synchronous "wake" signal wake_sync. Both wake and wake_sync are provided for optional use by a developer. They provide early indications that a data transfer is being requested and thus can serve to wake expansion module circuits that may be "sleeping" to conserve power. As noted above, wake_sync can be used to trigger a transition of module 12 from low-power mode to high-performance mode.

Resynchronization logic 81 provides synchronized versions cs0_b_sync and cs1_b_sync of the chip select signals. These signals are provided for developer use. In addition, they are ANDed by an AND gate 87 to yield a timing signal cs_b_sync to state machine STM 37, which uses this signal as described below with reference to the state diagram of FIG. 7. The signals generated by SBI interface 35 are summarized in Table VI.

TABLE VI

Signals Generated by ASI Interface to PDA 11

| | |
|---|---|
| wake | Raw wake signal derived from the Springboard interface. This signal goes active when an access has started on the Springboard interface. This can be used to "wake up" any internal logic that may be shut down. |
| wake_sync | Double flopped version of the wake signal |
| lowbat_b_sync | Double flopped version of the low battery indication |
| cs0_b_sync | Double flopped version of cs0_b. Currently unused, but provided for applications that may want to use it. |
| cs1_b_sync | Double flopped version of cs1_b. Currently unused, but provided for applications that may want to use it. |
| oe_b_sync | Double flopped version of oe_b. Currently unused, but provided for applications that may want to use it. |
| we_b_sync | Double flopped version of we_b. Currently unused, but provided for applications that may want to use it. |
| cs_b_sync | This is the logical combination of the cs0_b_sync and cs1_b_sync signals. If either of these two signals go active, the cs_b_sync will go active. This is used to control the Springboard State Machine |

In a manner of speaking, state machine STM 37 is designed to fill a control-signal communications gap between SBB bus 14 and ASB bus 15. During a data transfer operation, ASB bus asserts a wait signal, bwait, until it completes its role in the transfer. ASI interface converts the bwait signal to an arm_nWAIT signal. The arm_nWAIT signal is intended to inform an Arm7 processor that it must wait before it considers the transaction is completed.

However, the Springboard bus protocol does not provide for reception of a wait signal (by any name). SBB bus 14 determines by lapse of time when a transaction is complete. This time is programmable. Developers are encouraged by Handspring, Inc. to include a wait setting in their initialization routine to that the Visor can contend with the maximum latencies associated with data transfers with the module. However, this delay cannot be adjusted during the course of a data-transfer operation. There is no way for an expansion module to affect the timing of a data transfer without actually interrupting the data transfer. If for some reason, the read data is not ready by the end of the programmed delay, PDA 11 will read invalid data and treat it as valid.

To address this potential problem, state machine STM 37 detects when ASB bus 15 treats a transaction as over (according to arm_nWAIT) and when SBB bus 14 considers a transaction as over (according to cs_b_sync). If SBB bus 14 treats a transaction as over no sooner than ASB bus 15 does, the transaction is considered successful. If PDA treats the transaction as over before ASB bus 15 does, an error is indicated. A developer can use this error indication to trigger an interrupt to PDA 11 to initiate an error-handling routine or to reset expansion module 12.

State machine STM 37 comprises seven states 91–97. Idle state 91 is the default state state. During idle state 91, write_wait_control is asserted to continuously reset write-wait counter 45 to the value of write_delay_count. Other signals assertable by state machine STM 37 are not asserted during idle state 91.

A transition from idle state 91 to write-wait state 92 is made when the complex condition !cs_b_sync & oe_b & !w_c is met. This condition is met only during write operations when wc is not zero during the idle state. Since write-wait counter 45 is continuously reset during idle state 91, w_c can only be zero during idle state 91 when configuration value write_delay_count is zero. When configuration value write_delay_count is not zero and a write operation is requested, the condition for entering state 92 is met.

Only during write-wait state 92 does state machine STM 37 de-assert write_wait_control, allowing write-wait counter 45 to count down to zero. While the count is not zero, write-wait counter 45 de-asserts w_c and state machine STM 37 remains in write-wait state 92. When zero is reached, write-wait counter asserts w_c, and the state transitions from write-wait state to begin-access state 93. Since the function of counter 45 is simply to time write-wait state 92, it is functionally part of state machine 37; the counts represent substates of write-wait state 92.

Figure 8:
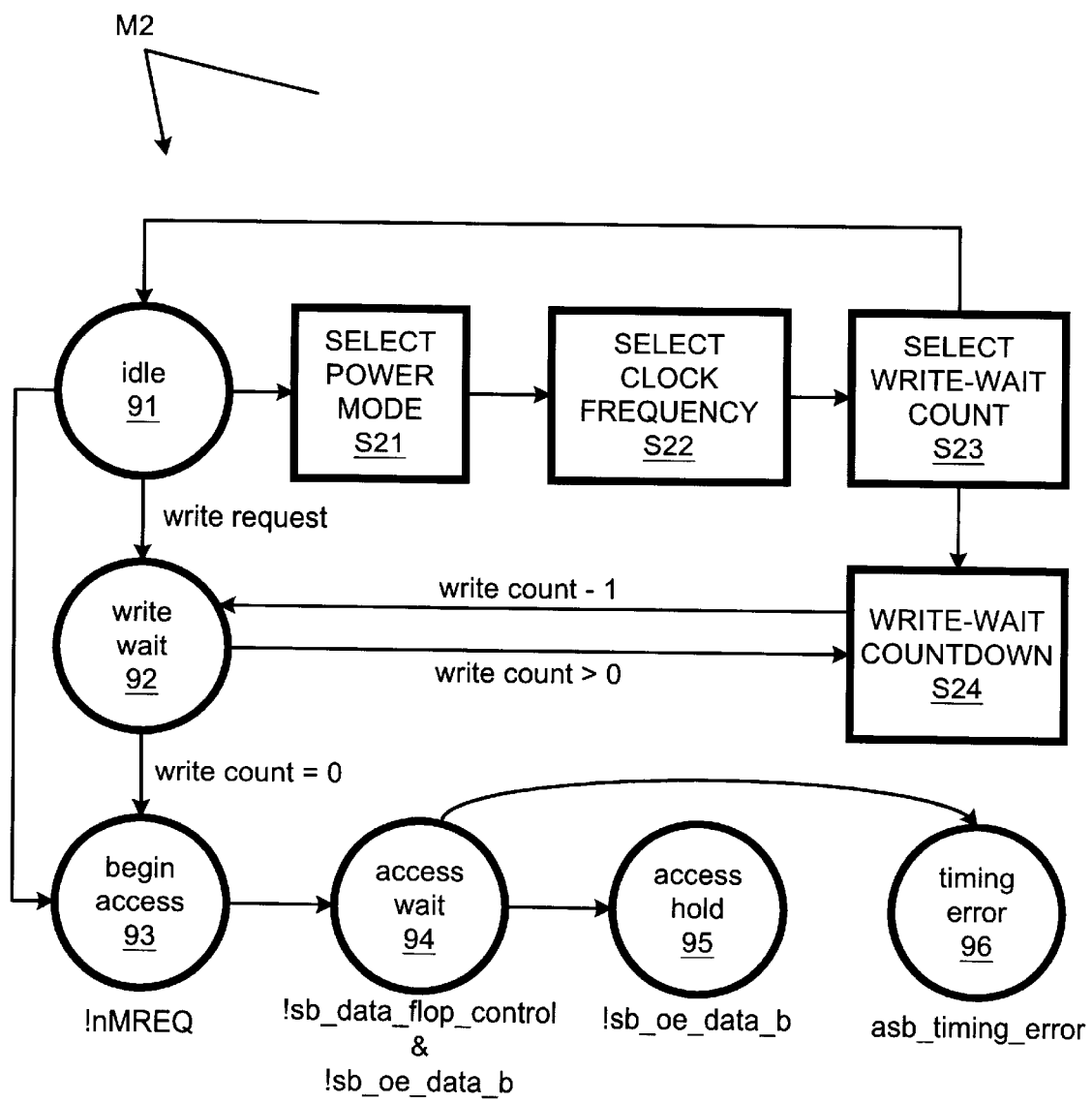
FIG. 8 is a flow chart of a write-wait method implemented by the system of FIG. 1.
Figure 9:
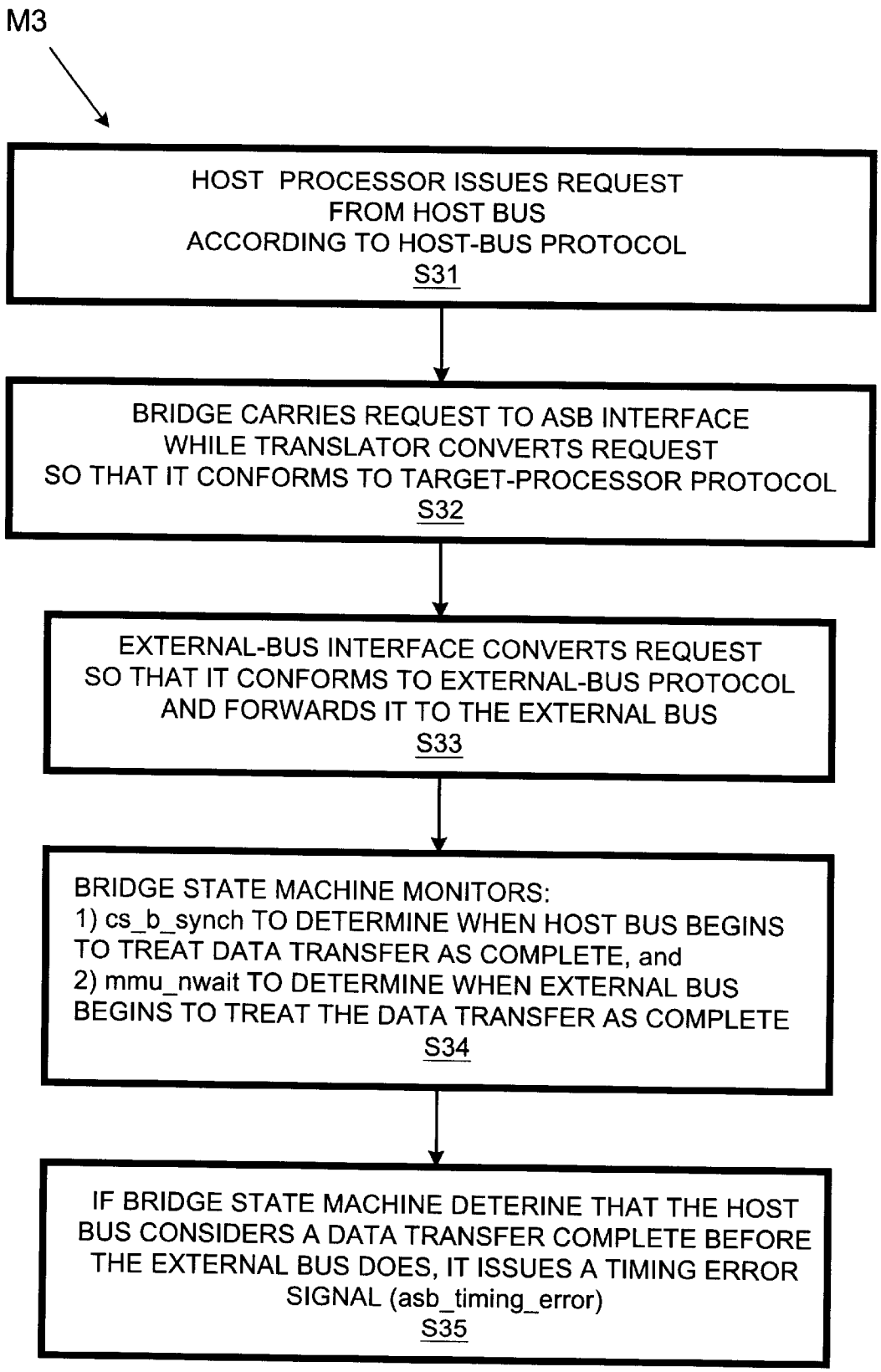
FIG. 9 is a flow chart of a data-transfer coordination method implemented by the system of FIG. 1.
Figure 10:
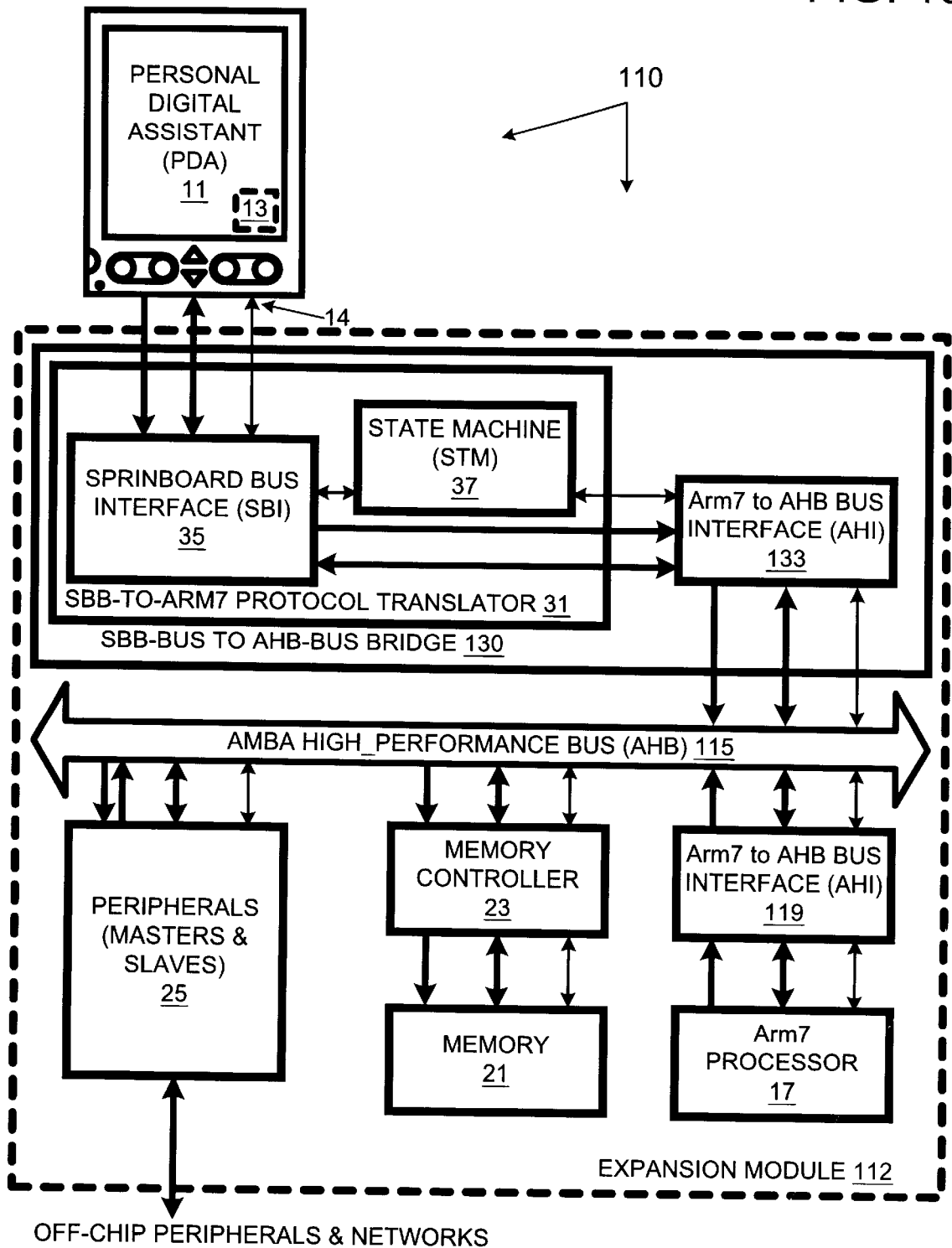
FIG. 10 is a schematic illustration of a second system including the personal digital assistant of FIG. 1 but bridging to a different (AHB) external bus.

As noted above, the invention provides for varying the write count. A method M2 for doing so is flow-charted in FIG. 8. Steps S21, S22, and S23 occur during idle state 91. In step S21, the power mode is selected, e.g., as a function of the most recent asserts of lowbat_b_sync and wake_sync. At step S22, a corresponding clock frequency is selected. For example, the clock used for low-power mode can be one-fourth that used for high-performance mode.

At step S3, a write-wait count is selected as a function of the clock frequency. To maintain a constant write-wait state duration, the low-power count can be one-fourth the high-power count. However, the developer is free to select other count relationships. In the event of a write request, state machine 37 transitions to write-wait state 92. During this state, step S24 involves counting down from the select count to zero. This ends the iteration of method M2 until idle state 91 is reached again.

Figure 7:
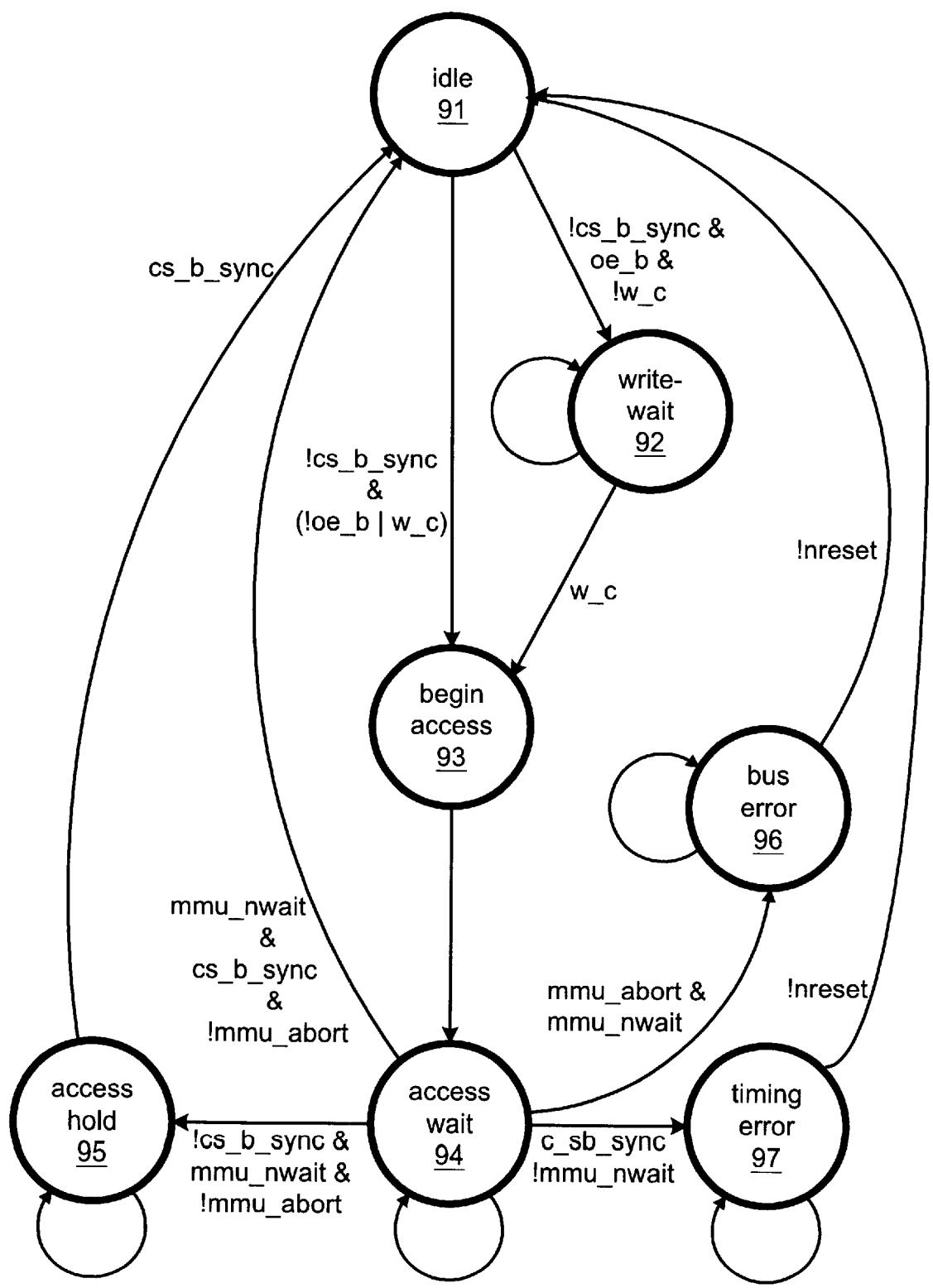
FIG. 7 is a state diagram of a state machine of the bus bridge of FIG. 1.

Begin-access state 93 can also be reached from idle state 91 directly, without going through write-wait state 92. In the case of a read operation, the condition !cs_b_sync & !oe_b is met, so the transfer is made from idle state 91 to begin access state 93. In the case of a write operation when write_wait_count is zero, the condition !cs_b_sync & w_c is met, so the transfer is made directly to begin access state 93. Note that FIG. 8 indicates signals issued during some states, while FIG. 7 shows all the states and the signal conditions causing transitions between states.

The signal cs_b_sync is active when a request is made until PDA 11 considers the response complete; thus cs_b_sync serves as a "data-transfer-active" signal to state machine 37. Signal oe_b is asserted during a read operation and not during a write operation; thus, signal oe_b serves as a "read/write" signal to state machine 37.

State-machine STM 37 asserts a memory transfer request as signal arm_nMREQ while in begin-access state 93. This is translated by ASI interface 33 into a transfer request areq to ASB bus 15. It should be noted that arm_LOCK is held inactive. Begin-access state 93 only endures for one clock cycle of bclk, after which there is an unconditional transfer to access wait state 94. (Note that other processor protocols might obviate the need for a begin-access state and proceed directly from an idle or write-wait state to an access-wait state.)

In access-wait state 94, state machine STM 37 monitors arm_nWAIT, which indicates when ASB bus 15 considers a data transfer complete, and cs_b_sync, which indicates when SBB bus 14 considers a data transfer complete. If ASB bus 15 completes a data transfer while SBB bus 14 is waiting for the transfer to be completed, the data transfer is considered valid. If SBB bus 14 treats a transfer as completed before ASB bus 15 actually completes the transaction, a timing error is indicated.

Access-wait state 94 usually endures as long as arm_nWAIT is asserted. ASI interface 33 asserts this signal while ASB bus 15 asserts agnt to ASI interface 33 (indicating that the interface has control of ASB bus 15) and bwait (indicating the bus is servicing the request). When nwait is no longer asserted, access-wait state 94 is exited.

During access-wait state 94, sb_data_flop_control is active. In the event of a read operation, state machine STM 37 receives an active oe_b and asserts sb_data_oe_b in response. As indicated in FIG. 5, the sb_data_flop_control and sb_data_oe_b signals control the coupling of sb_data_out{15:0} and d{15:0}. Thus, in the event of a read operation, during access-wait state 94 data is continuously driven to SBB bus 14. After a predetermined lapse of time, SBB bus 14 treats the received read data as valid and de-asserts oe_b and the associated chip select signal.

The signal sb_data_flop_control is always active during access-wait state 94. It is thus available for developer use for either read or write operations or both. In the context of FIG. 5, sb_data_flop_control is only used to control multiplexter 75, which holds the presumably valid data in register 77 constant for subsequent reading by PDA 11. State machine 37 sends sb_data_flop_control inactive in response to arm_nWAIT going inactive, which corresponds to the time read data is considered valid. Thus, sb_data_flop_control serves as a "read-data valid" signal to SBI interface 35.

Normally, SBB bus 14 is still waiting for a response to its request when ASB bus 15 signals that the request has been met. In this case, arm_nWAIT is de-asserted while cs_b_sync is still active. In this event, the state transitions from access-wait state 94 to access-hold state 95 (provided arm-ABORT is not active).

Access-hold state 95 serves to ensure cs_b_sync is deasserted before idle state 91 is resumed to avoid an erroneous detection of another transfer request. If the current operation is a read operation, then oe_b is active. In this case, sb_data_oe_b continues to be asserted duing access-hold state 95. However, sb_data_flop_control is deasserted upon the transition to access-hold state 95. This latches the data in register 7 (FIG. 5) 7, while buffer 73 continues to drive its contents to SBB bus 14. Thus, SBB bus 14 should be receiving valid data until it "decides" the current transaction is over.

SBB bus 14 ends a transaction by de-asserting a chip select signal, which causes cs_b_sync to be inactivated. If the request was for a data read, oe_b is also inactivated. In these events, the transition is made to idle state 91, completing a normal data transfer. If, while in access-wait state 94, cs_b_sync and arm_nWAIT are deactivated concurrently (assuming arm_ABORT is not active), a transition is made to idle state 91 without passing through access hold state 95. The result should be a successful data transfer.

If, on the other hand, during access-wait state 94, cs_b_sync is de-asserted before arm_nWAIT, then there is no guarantee that the data transfer is successful. In the case of a write operation, SBB bus 14 has stopped providing the data before ASB bus 15 has had time to store it. In the case of a read operation, SBB bus 14 has read data before ASB bus 15 has indicated that the data is valid. In this case, a transition is made from access-wait state 94 to timing-error state 96.

During timing-error state 96, state machine STM 37 asserts signal asb_timing_error. This signal is made available to the developer to use for any purpose, including determining when to activate nreset. State 96 persists until the expansion module is reset by an assertion of nreset. In that case, idle state 91 is resumed.

If ASB bus 15 detects an error during a transaction, it asserts error. In response, ASI interface 33 asserts arm_ABORT. According to the Arm7 protocol, this arm_ABORT signal is valid only when arm_nWAIT is inactivated. If when arm_nWAIT is inactivated, arm_ABORT is being asserted, then a transition is made to bus-error state 97. During bus-error state 97, state machine STM 37 asserts asb_bus_error. This signal can be used by a developer for any purpose, including determining when to generate nreset. Bus-error state 97 is only exited upon an assertion of nreset. In that case, idle state 91 is resumed.

The signals generated by state machine STM 37 are summarized in Table VII.

TABLE VII

Signals Generated by ASI Interface to SBB bus 14
(excluding Arm7 Protocol Signals)

| | |
|---|---|
| sb_data_flop_control | Control signal from the Springboard State Machine to the Springboard Interface. If asserted, new ASB read data is flopped to be driven out on the Springboard interface. |
| sb_data_oe_b | Control signal from the Springboard State Machine to the Springboard Interface. If low, then read data is driven out on the external Springboard interface. Otherwise, the bus is tristated. lowbat_b assertion overrides this signal and disables the data bus. |
| write_wait_control | Control signal for the write wait counter. This signal is controlled by the Springboard state machine. When 0, the write delay counter is loaded with the value specified by the write_delay_count configuration signal. When 1, the counter is decremented until it reaches 0. The counter will not wrap around once it reaches zero; it will stop at zero |
| asb_timing_error | Indication from this state machine that the ASB transaction took longer than the Springboard transaction. |
| asb_bus_error | Indication from this state machine that an bus error occurred on the ASB bus. |

The state machine states are summarized in Table VIII.

TABLE VIII

State Machine States

| | |
|---|---|
| idle | Wait for transaction to be detected on the springboard interface. The next state will be the write wait state when a springboard write access is detected and the write counter has not expired. The write counter will have only expired if the initial value of the counter is set to 0. The next state will be the begin access state when a springboard read access is detected or a write access is detected and the write counter has already expired or initially is zero. |
| write | Wait for Springboard write data to setup. When in this state, |

TABLE VIII-continued

State Machine States

| | |
|---|---|
| wait | the write delay counter will be enabled to count down from its initial value. The interface will remain in this state until the write counter has expired (reached 0). At that time the write data from the springboard interface must be valid. |
| begin access | Asserts request to the ASB bus. This state is needed to give the ASB interface time to assert arm_nWAIT. |
| access wait | Wait for the end of the ASB or Springboard transaction. See below this table for details. |
| access hold | Wait for the end of the Springboard transaction. When in this state, the ASB transaction has completed, and the Springboard transaction has not completed. The state machine will remain in this state until the cs_b_sync signal is set to 1. |
| bus error | Indicate that the ASB interface returned a bus error. The signal asb_bus_error is asserted. The only way to exit this state is to reset the machine. |
| timing error | Indicate that the ASB interface took longer than the Springboard transaction. The signal asb_timing_error is asserted. The only way to exit this state is to reset the machine. |

While in the access-wait state, read data is sampled from the ASB bus and driven out on the Springboard interface if the current Springboard transaction is a read. One of a number of functions can happen while in this state. The following describes each of the functions.

While in the access-wait state, if the cs_b_sync signal is set to 1, the arm_nWAIT signal is set to 1, and arm_ABORT is set to 0, this indicates that the transaction is finished on both the ASB and the Springboard interfaces. In this case, the state machine will return to the idle state.

While in the access-wait state, if the cs_b_sync signal is set to 0, the arm_nWAIT signal is set to 1, and arm_ABORT is set to 0, this indicates that the transaction is finished on the ASB, but not on the Springboard interface. In this case, the state machine will go to the access hold state and remain there until the cs_b_sync signal is set to 1, indicating the Springboard access is complete.

While in the access-wait state, if the cs_b_sync signal is set to 1 and the arm_nWAIT signal is set to 0 and the arm_ABORT signal is set to 0, this indicates that the ASB transaction did not complete before the Springboard transaction completed. This is an error condition, and the state machine will go to the timing error state.

While in the access-wait state, if the arm_ABORT signal is set to 1 when the arm_nWAIT signal transitions to 1, this indicates a bus error condition. In this case, the state machine will go to the bus error state.

If the cs_b_sync signal is set to 1 and neither the arm_nWAIT nor the arm_ABORT signals are set to 1, this indicates that the ASB transaction has not yet completed. In this case, the state machine will remain in the access wait state.

There are several restrictions placed on the Springboard to ASB bus bridge because of the limitations of some Springboard bus. The Springboard is a master only bus, incapable of accepting variable wait states. Also, it is an asynchronous interface, so there is a time penalty in resynchronizing the Springboard signals to the ASB clock domain. These restrictions are summarized in the following sections.

Initial version of the Handspring are clocked at ~16 MHz, and have a maximum access length of 425 nS. There are a programmable number of wait states in the Handspring processor. Springboard documentation includes additional information on the timing of the Springboard interface.

The SB-ASB is typically limited to a 100 MHz ASB bus in .2u process. If the ASB bus is run faster than this, there is a limitation of how fast the ASB bus can run based on Springboard timings. The state machine uses cs0_b, cs1_b, and oe_b to recognize the beginning of a Springboard transaction and to decide whether the transaction is a read and a write. There can be at most 1 ASB clock cycle between the assertion of csX_b and oe_b. If there are any more cycles, the interface will be confused.

Since the Springboard bus is a master only bus, the internal ASB bus must respond within the bounds of the Springboard transaction. This places a minimum speed on the internal ASB bus.

A minimum of three ASB clock cycles is required to perform a transaction:

1 cycle for resynchronization
1 cycle for the Springboard state machine
1 cycle for the ASB state machine This assumes that the ASB interface is parked on the bus and there is no decode cycle penalty. If either of these are not the case, then each will add an additional cycle penalty. The slowest the internal ASB bus could run is approximately 10 MHz.

The ASB peripherals should be designed to so that they can not create access times longer than the Springboard transaction. The number of Springboard interface wait states must, at a minimum, allow enough time for the worst case ASB transaction to complete.

The wake up logic can wake up the internal logic at any point, as long as the timing requirements are met. Two versions of the wake up signal are provided, a raw version and a double flopped version. As per the Springboard spec, just before power is removed from the expansion the Handspring software will configure the expansion peripheral for low power mode and then assert lowbat_b. When lowbat_b is asserted, the external data bus can not be driven and any internal interrupt will not be propagated out of the expansion module.

The invention provides for the following data transfer method M3 implemented in system 10. In step S31, PDA 11 issues a data-transfer (read or write) request. Processor 13 originates the request. The request conforms to t he Springboard protocol a s it is transmitted from SHB bus 14. Translator 31 converts the request to conform to the ARM7 protocol, in which form it is provided to ASI interface 33 at step S32. ASI interface converts the request to conform to the ASB protocol, in which form it is provided to ASB bus 15 at step S33.

Translator 31 monitors signals from both buses at step S34 to determine when each of them begins to treat the requested data transfer as complete. Specifically, state machine STM 37 monitors cs_b_sync to determine when SBB bus 14 begins to treat the data transfer complete, and monitors arm_nWAIT to determine when ASB bus 15 begins to treat the data transfer as complete. To ensure a valid data transfer, SBB bus 14 should not treat a data transfer as complete before ASB bus 15 does. If translator 31 determines that SBB bus 14 treated a data transfer as complete before ASB bus 15 did, state machine STM 37 issues a warning in the form signal asb_timing_error at step S35.

The advantages of the invention become more apparent with study of a second system 110, shown in FIG. 7. System 110 uses the same Visor PDA 11, but a different expansion module 112. Expansion module 112 employs an AMBA High-Performance Bus (AHB) 115. The AHB bus is a flexible multi-master bus defined by Arm Limited in the "AMBA Specification", available at the Arm Limited website www.arm.com.

Since a different external bus is used, different Arm7 interfaces are used. Thus, Arm7 processor 17 is coupled to AHB bus 115 via an Arm7 to AHB interface (AHI) 119. Likewise, translator 31 is coupled to AHB bus 115 via AHI interface 133.

Significantly, however, the same translator 31 is used for both bridge 30 of FIG. 1 and bridge 130 of FIG. 7. Thus, the same PDA Bus interface SBI 35 is used, and the same state machine STM 37 is used. Thus, once translator 31 is designed, little additional effort is required to make other Arm7 compatible busses available to a Visor PDA. Accordingly, the invention readily provides for a Springboard to VPB bus bridge and a Springboard to PI bus bridge. (Both the VPB and PI buses are defined by Philips Semiconductor.)

The invention provides for translation targets other than Arm processors. For example, a Springboard to Intel Pentium translator can be used for interfacing a Visor PDA to ISA, PCI, and Microchannel busses. Likewise, a Springboard to Motorola Power PC translator can be used for interfacing a Visor PDA to Macintosh II buses and to PCI buses.

The invention provides for hosts other than Springboard based PDAs. Any device, whether or not it is a PDA, using the Springboard bus can take advantage of the invention. In addition, other devices, such as laptops with PCCard interfaces can use the invention to expand their capabilities. These and other variations upon and modifications to the detailed embodiments are provided for by the present invention, the scope of which is limited by the following claims.

What is claimed is:

1. A bridge for managing data transfers that are requested by a host processor and directed via a host bus to an external bus, where said external bus can provide for wait states that are variable on a per-transfer basis, while said host bus utilizes wait states that are not variable on a per-transfer basis, said bridge comprising:
   a host-bus interface to said host bus;
   an external-bus interface to said external bus, said external-bus interface being coupled to said host-bus interface via data and address lines; and
   a state machine, said being coupled to said interfaces for receiving control signals therefrom and for providing said control signals thereto, said state machine receiving from said host-bus interface a "data-transfer" signal indicating when said host bus is treating a data transfer as active, said state machine receiving from said host-bus interface a "read/write" signal indicating whether a data-transfer request is for a read or a write operation, said state machine receiving from said external-bus interface a "wait" signal indicating when said external bus is treating a data transfer as active, said state machine providing to said external-bus interface a "request" signal when a data-transfer request is being made, said state machine providing to said host-bus interface a "valid" signal indicating when read data provided via said external-bus interface is valid, said state machine including the following states
     an "idle" state in which said state machine is in only while said data-transfer signal is inactive, said state machine while in said idle state holding said request signal inactive and said valid signal inactive,
     an "access-wait" state in which said state machine is in only while said data-transfer signal is active and while said wait signal is active, said state machine while in said access-wait state holding said valid signal inactive, said state machine moving, directly or indirectly, from said idle state to said access wait state only when said data-transfer signal becomes active, and
     an "access-hold" state in which said state machine is in only while said data-transfer signal is active and while said wait signal is inactive, said state machine moving from said access-wait state to said access-hold state only when said wait signal goes inactive while said data-transfer signal is active, said state-machine in said access-hold state holding said valid signal active, said state machine moving from said access-hold state to said idle state only when said data-transfer signal becomes inactive.

2. A bridge as recited in claim 1 wherein said state machine further includes a timing-error state, said state machine moving from said access-wait state to said timing error state only when said data-transfer signal becomes inactive no later than said wait signal as determined by said state machine.

3. A bridge as recited in claim 2 wherein said state machine issues a timing-error signal while in said timing-error state.

4. A bridge as recited in claim 1 wherein said state machine moves from said access-wait state directly to said idle state only when said data-transfer signal and said wait signal go inactive at the same time as determined by said state machine.

5. A bridge as recited in claim 1 wherein said state machine further comprises a "begin-access" state through which said state machine passes whenever it moves from said idle state to said access-wait state, said state machine holding said request signal active during said begin-access state.

6. A bridge as recited in claim 5 wherein said state machine further comprises a "write-wait" state, said state machine moving from said idle state to said write-wait state only when said data-transfer signal becomes active and said read/write signal indicates that a write operation is requested, said state machine moving from said write-wait state to said begin-access state after a predetermine duration in said write-wait state.

7. A state-machine method of coordinating a read request from a host bus and a response to said read request from an external bus, said request originating from a host processor coupled to a host bus and transferred from said host bus to a target bus via a bus bridge, said method comprising the steps of:
   moving, directly or indirectly, from an "idle" state to an "access-wait" state in response to a read request;
   holding a "valid" signal inactive during said access-wait state;
   moving from said access-wait state to an "access-hold" state only when a wait becomes inactive while a data-transfer signal is active, said wait signal becoming inactive indicating that said external bus is treating said response as complete, said data-transfer signal being active indicating that said host bus is treating said response as incomplete;
   holding said valid signal active during said access-hold state so as to indicate that read data available to said host bus is valid; and
   moving from said access-hold state to said idle state when said data-transfer signal becomes inactive.

8. A method as recited in claim 7 further comprising the steps of:

moving from said access-wait state to a "timing-error" state only when said state machine determines that said wait signal becomes inactive before said data-transfer signal becomes inactive, and holding a "timing-error" signal active while in said timing-error state.

9. A method as recited in claim 7 further comprising a step of moving from said access-wait state directly to said idle state only when said state machine determines that said data-transfer signal goes inactive at the same time said wait signal goes inactive.

10. A method as recited in claim 7 wherein said step of moving from said idle state to said access-wait state further involves moving first from said idle state to a "begin-access" state, and exiting from said begin-access state after a pre-determine time interval to said access-wait state.

* * * * *